R. F. COOK.
BREECH-LOADING FIRE-ARMS.
No. 7,478. Reissued Jan. 30, 1877.
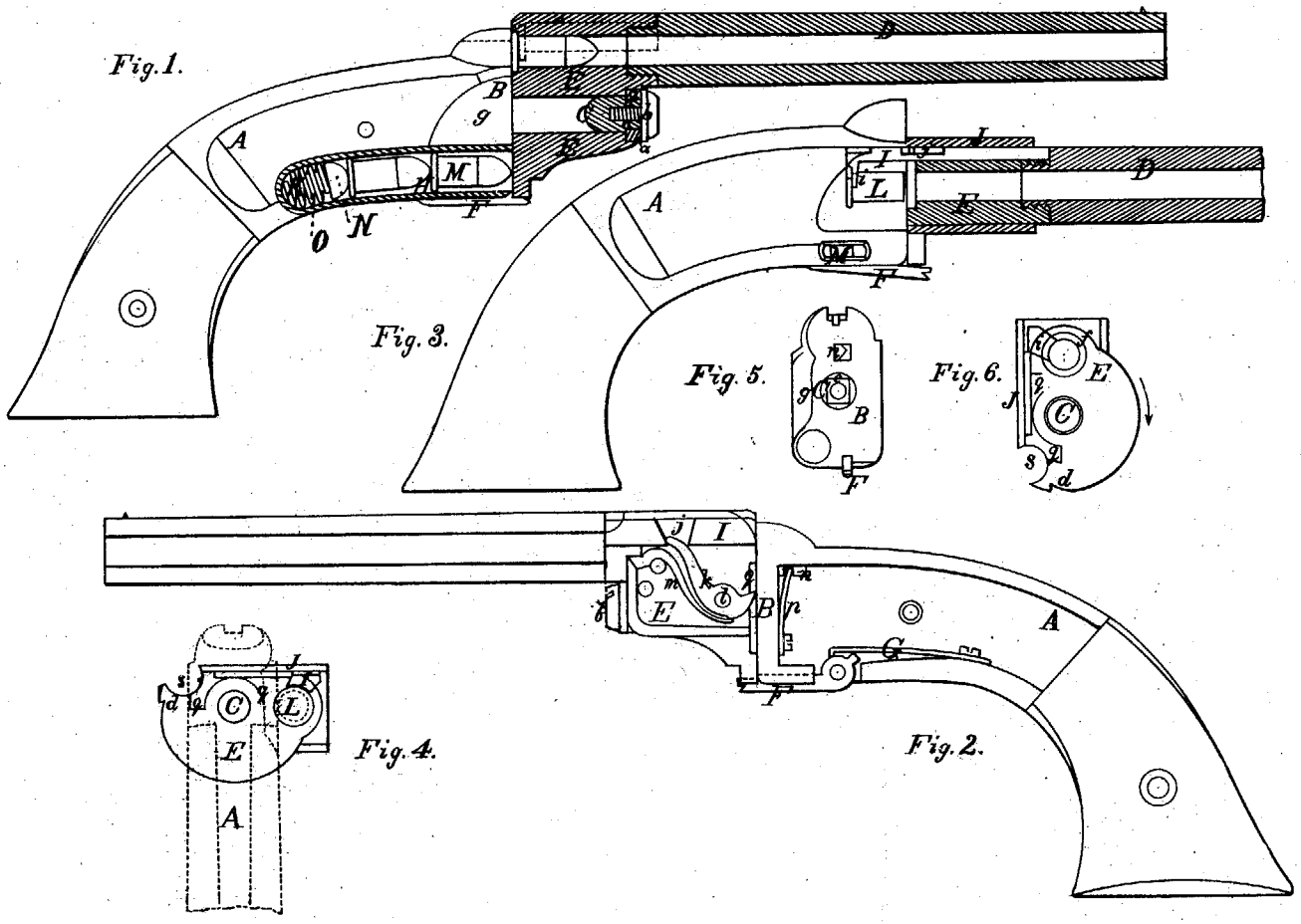
WITNESSES
Villette Anderson.
E. H. Bates
INVENTOR,
Roswell F. Cook.
Chipman Hosmer & Co.
ATTORNEYS.
N. PETERS, PHOTO-LITHOGRAPHER, WASHINGTON, D. C.

UNITED STATES PATENT OFFICE.

ROSWELL F. COOK, OF ILION, NEW YORK.

IMPROVEMENT IN BREECH-LOADING FIRE-ARMS.

Specification forming part of Letters Patent No. 37,854, dated March 10, 1863; reissue No. 7,478, dated January 30, 1877; application filed October 2, 1875.

*To all whom it may concern:*

Be it known that I, ROSWELL F. COOK, formerly of Watertown, in the county of Jefferson, but now of Ilion, in the county of Herkimer and State of New York, have invented certain new and useful Improvements in Breech-Loading Fire-Arms; and I do hereby declare that the following is a full, clear, and exact description of the same, reference being had to the accompanying drawings, forming part of this specification, in which—

Figure 1 is a vertical longitudinal section of a pistol constructed according to my invention, showing it in condition for firing. Fig. 2 is a left-hand side view of the same with the side plates removed to expose the mechanism for withdrawing the cartridge and the stop which stops the barrel, in position for firing. Fig. 3 exhibits a side view of the stock and a central section of the barrel, the latter having been turned aside from the stock to throw out a discharged cartridge-case. Fig. 4 is a transverse section in the plane *x x*, representing the parts in positions corresponding with Fig. 3. Fig. 5 is a face view of the breech. Fig. 6 is a back view of the barrel, or of the chamber-piece into which the barrel is firmly secured.

Similar letters of reference indicate corresponding parts in the several figures.

My invention relates to magazine fire-arms; and consists in certain improved means for extracting the discharged cases from the barrel in such fire-arms, and in a novel construction whereby such fire-arm may be loaded, or the barrel charged either by hand or from the magazine, according to the will of the operator—that is to say, the gun may be used as a single-loading breech-loader while the magazine is held in reserve.

It also consists in a construction and combination of parts whereby the magazine may be charged directly through its delivery mouth or orifice without moving the magazine-tube in or from its seat, or removing it or any part of the gun, and without a previous compression of the magazine-spring.

To enable others skilled in the art to make and use my invention, I will proceed to describe its construction and operation.

A B is the stock-frame, the front portion B of which constitutes the breech. C is a short pin, secured firmly in the front of the frame, to constitute the axis about which the barrel and stock move relatively to each other to open and close the breech. This pin is perpendicular to the face of the breech. D is the barrel, secured firmly into a chamber-piece, E, which is deep enough for the pin C to pass through it below the bore of the barrel, and which is bored out parallel with the bore of the barrel for the reception of the said pin. The rear of the chamber-piece E is faced perpendicular with the two bores to fit closely against the face of the breech.

Instead of being screwed into piece E, as above described, the barrel may be forged or otherwise made with its rear portion of sufficient depth for the reception of the pin C, and to constitute a gate or stop for covering and holding the cartridges within the magazine.

The barrel is secured on the pin C by means of a collar, *a*, fitted to a square, *c*, on the end of the pin, and a screw, *b*, screwing into a tapped hole in the pin. In the lower part of the chamber-piece E there is a notch, *d*, (see Fig. 6,) which, when the barrel is brought to the proper position for firing, receives a catch, F, attached to the frame. This catch works upon a pivot, *e*, in a slot in the bottom of the frame, and its front end is held up by the pressure of a spring, G, upon its rear part. The said catch and notch are formed to prevent the barrel from being turned to the left upon the pin C, but beveled, as shown in Figs. 5 and 6, to permit it to turn to the right, as indicated by the arrow in Fig. 6. This movement is permitted to the extent of nearly half a revolution, and only limited by the swell *f* of the outside of the chamber or barrel, which comes in contact with the catch, and stops the barrel with its bore opposite to the mouth of the cartridge-magazine H, which is provided in the lower portion of the frame A B, below the pin C, and which may also extend any distance back into the stock.

When the barrel is turned about half, or a little more than half way to the magazine, as shown in Figs. 3 and 4, the chamber is exposed in an open condition on the right-hand side of the stock, in which there is formed a recess, *g*, for the passage of the cartridge into the chamber in the loading of the piece by hand, and for the passage of the empty cartridge-cases when the latter are withdrawn from the chamber preparatory to reloading. The cartridges should have their cases of metal.

I is a slide working, parallel with the bore of the barrel, in a guide-groove provided for it in the left-hand side of the chamber-piece or rear portion of the barrel, and having attached to or formed upon its front end a hook, *i*, for withdrawing the empty or discharged cartridge-cases from the chamber. When the cartridge is in the chamber this hook is received within a recess in the rear end of the latter, and is situated in front of the flange, which is provided around the rear end of the cartridge-case. The slide I has in its outer side a notch, J, for the reception of the end of a lever, *k*, which works on a fulcrum, *l*, in the chamber-piece or barrel. The lever has applied to it a spring, *m*, which acts to throw forward its upper end, and make it press forward the slide I, and when the barrel is in proper position for firing the said lever holds the slide far enough forward to prevent the hook from interfering with the cartridge, the rear end of the said lever being at the same time just clear of the breech, as shown in Fig. 1. The slide I, lever *k*, and spring *m* are all covered by a plate, J, which is omitted in Fig. 2, to expose the said parts to view. Above the pin C there is fitted into the breech a small slide, *n*, to which there is applied within the frame a spring, *p*, which presses the said slide forward and tends to protrude its point through the surface of the breech. When the barrel is in position for firing this slide *n* is held back by its point being in contact with the rear of the chamber-piece or barrel, but, upon turning the barrel to the right upon the pin C for the purpose of reloading after firing, the point of the said slide is brought opposite to a recess, *q*, Figs. 2 and 6, in the face of the chamber-piece, and so permitted to be pressed forward by the spring *p*, far enough to catch the rear end of the lever *k*, which is thus caused to press downward as the movement of the barrel upon pin C is continued, and by this means the upper end of the said lever is thrown back and caused to draw back the slide I and hook *i*, and the latter is thus caused to draw the discharged cartridge L from the chamber, as shown in Fig. 3.

The above-described movement of the barrel being continued slightly beyond the position to draw out the cartridge, carries the point of the slide *n* clear of the lever *k*, and leaves the latter under the control of the spring *m*, which then operates upon it to throw forward the upper end and return the slide I. In the above-described operation the piece should be held with the barrel upward at an inclination of about forty-five degrees, and the cartridge-case, as soon as it has been drawn from the chamber, will drop out of the way, and make room for the introduction of another cartridge into the chamber, if it be desired to load by hand, in which case, after the cartridge has been inserted into the chamber, the barrel merely requires to be turned back again to close the breech and bring the piece to a condition for use.

The magazine H consists simply of a tube or passage of caliber large enough to receive the cartridges M M, one behind another, and to allow them to move freely along it, and it is fitted with a follower, N, which is pressed forward by means of a spring, K.

When it is desired to load from the magazine, the barrel is turned to the right till the catch F comes in contact with the swell *f*, as before described, and the barrel being brought opposite to the magazine permits the spring O to force forward all the cartridges, and deliver the front one into the chamber, and when this has been done the barrel is turned back till the catch F enters the notch *d*.

In order to provide for the filling of the magazine with cartridges without taking the barrel apart from the frame, the catch F is permitted to be depressed from the notch *d*, to allow the barrel to be turned to the left, or in the opposite direction to that indicated by the arrow in Fig. 6, to bring the mouth of the magazine opposite to a recess, *s*, provided on the lower part of the left-hand side of the chamber-piece or barrel, in which position of the magazine the cartridge can be inserted directly through the delivery-orifice or mouth thereof without previous preparation of compressing the spring.

The lock of this fire-arm may be constructed and applied in the usual or any well-known manner, and therefore I have not thought it necessary to represent it in the drawings.

I do not claim the hooked slide for withdrawing the discharged cartridge-cases from the chamber after the fire-arm; but

What I claim as my invention, and desire to secure by Letters Patent, is—

1. The lever *k*, spring *m*, slide *n*, and spring *p*, the whole applied in combination with each other and the hooked slide I *i*, the chamber-piece E or barrel, and the breech B, and operating substantially as and for the purpose herein specified.

2. In combination with the magazine, arranged below the axis about which the barrel and stock move relatively to each other, the frame A B, so constructed that at a certain position between that proper for firing from the magazine the rear end of the barrel or chamber is exposed in an open condition, thereby providing for loading by hand or from the magazine, as may be convenient, substantially as herein described.

3. The recess *s* in the lower part of the left-hand side of the chamber-piece E, in combination with the magazine H, and a spring contained therein, substantially as and for the purpose described.

4. In a magazine-gun, the combination of a barrel open at breech, a magazine, and a gate or stop, operating together substantially as specified, whereby the gun may be loaded automatically from the magazine or by hand while the magazine is held in reserve.

5. In magazine fire arms, a fixed magazine or tube carrying a propelling or cartridge feeding spring, the delivery end of which may be uncovered to receive the cartridges directly through the delivery-orifice while in position against the pressure of the spring, as set forth.

6. A magazine or receptacle for cartridges when fixed to and combined with a breech-loading fire-arm, so as to be charged directly through the delivery-orifice while in position, substantially as described.

In testimony that I claim the above I have hereunto subscribed my name in the presence of two witnesses.

ROSWELL F. COOK.

Witnesses:
J. B. PELTON,
W. J. LEWIS.